May 17, 1938. H. R. MOYER 2,117,902
MOLDED ARTICLE
Filed Nov. 28, 1936
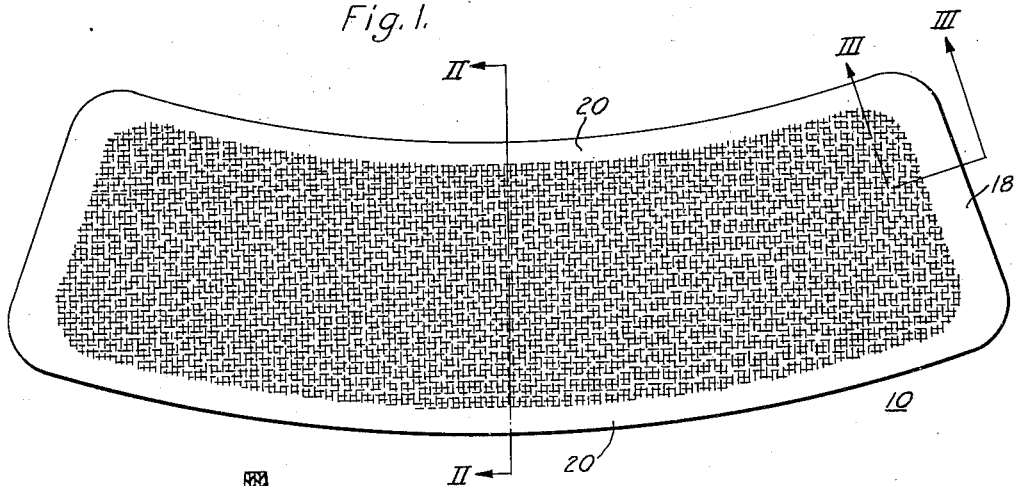
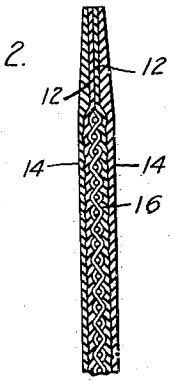
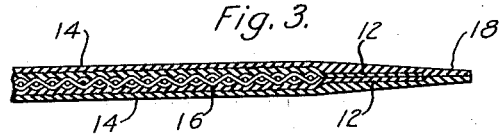
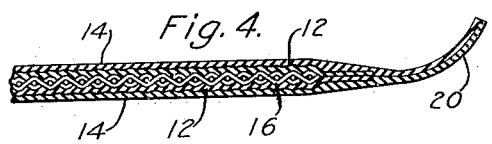
WITNESSES:
INVENTOR
Howard R. Moyer
BY
ATTORNEY Patented May 17, 1938

2,117,902

UNITED STATES PATENT OFFICE 2,117,902

MOLDED ARTICLE

Howard R. Moyer, Wilkinsburg, Pa., assignor to Westinghouse Electric & Manufacturing Company, East Pittsburgh, Pa., a corporation of Pennsylvania Application November 28, 1936, Serial No. 113,183

4 Claims. (Cl. 18—8)

This invention relates to articles of manufacture such as molded inserts.

In the manufacture of rayon, the rayon thread is spun into the form of a hollow cake in a suitable spinning bucket. As spun, the thread contains acid which must be removed. In order to remove the acid from the thread, the rayon cake may be doffed from the spinning bucket and then subjected to a washing. Unless the hollow cake is suitably supported, it will collapse when doffed and washed.

Aluminum inserts have been employed heretofore for supporting the hollow cake, but these have proven to be unsatisfactory in that the acid present in the cake attacks the metal insert and the rayon thread is thus contaminated. The aluminum inserts further do not have as high a degree of resiliency as is desired in the insert.

An object of this invention is to provide an insert for supporting rayon cakes.

Another object of my invention is to provide an insert having a high degree of resiliency for supporting rayon cakes.

A further object of this invention is to provide a molded article having a high degree of resiliency and the property of being unaffected by acid which is suitable for supporting a cake of rayon thread or the like.

Other objects of this invention will become apparent from the following description when taken in conjunction with the accompanying drawing in which:

Figure 1 is a plan view of the molded article embodying the teachings of this invention.

Fig. 2 is a view greatly enlarged and in section taken along the line II—II of Fig. 1.

Fig. 3 is a view greatly enlarged and in section taken along the line III—III of Fig. 1, and Fig. 4 is a view greatly enlarged and in section similar to Fig. 3 illustrating a modification of this invention.

Referring to the drawing, and Figs. 1 and 2 in particular, this invention is illustrated with reference to a molded article 10. As illustrated in Fig. 2, the molded article 10 comprises a plurality of inner layers 12 and covering or outer layers 14 of sheet material disposed in substantially parallel relation with each other. The layers 12 and 14 of the sheet material may comprise any suitable fibrous material such as clothes of woven fabric, paper or the like which is suitably impregnated with a phenolic, urea or other condensation resin product.

In order to provide resiliency to the finished article, as will be more fully described hereinafter, a wire screen 16 having any suitable mesh is disposed between the inner layers 12 of the sheet material. The screen 16 is of a smaller surface area than the layers of the sheet material and when disposed between the layers, is completely covered, the impregnated sheet material extending beyond all edges of the screen as illustrated in Fig. 1.

In preparing the sheet material and the screen for assembling, they are so cut, trimmed or sheared into the shape of a truncated sector of a circle as illustrated in Fig. 1 that when assembled and molded as an integral unit and bent as hereinafter described, the molded unit will substantially simulate the shape of a frustrum of a cone.

In order to mold the screen and layers of impregnated sheet material into an integral unit, the assembled layers may be subjected to any suitable heat and pressure for causing the reaction of the impregnant and to compact the individual layers into an integral unit in the shape of a substantially flat plate. In molding the article, the resin of the different layers of the sheet material flows about the wires of the screen and integrally unites the screen and layers of sheet material, as illustrated in Figs. 2 and 3. As molded, all loose ends of the wires of the screen are imbedded in the resin and layers of the sheet material.

In order to provide thin flexible ends 18, the outer layers 14 of sheet material are cut longer than the inner layers 12, as illustrated in Fig. 3, so that when assembled, layers 14 extend beyond the ends of layers 12. When molded under heat and pressure, it is found that these thin composite ends are substantially flexible as compared to the edges 20 of the sides of the molded article in which the inner and outer layers 12 and 14, respectively, of the sheet material are of substantially the same width as illustrated in Fig. 2.

In practice, the molded unit described hereinbefore is found to be quite resilient. Although it is known that the impregnated sheet material of itself has a certain degree of resiliency when molded, it has a tendency to lose its resiliency upon exposure to moisture. The wire screen insert 16 disposed between the layers of sheet material and molded therein as an integral part of the molded unit in accordance with the teachings of this invention, provides a substantially permanent resilient molded unit.

In a modification of this invention as illustrated in Fig. 4, a permanent curvature 20 approximating the desired curvature of the bent insert may be imparted to the thin ends 18 during the molding of the article. This permanent curvature adds to the flexibility of the ends 18 and, because of the inherent spring action, insures flexibility.

As a further modification of this invention, the impregnated sheets of material with the wire screen disposed therebetween, may be molded as a curved plate instead of the thin flat plate hereinbefore described. Where the degree of curvature imparted to the plate is sufficient to produce a plate shaped as a semi-circle, it is found that the curved plate may more readily be bent into the desired shape. The degree of curvature may vary as desired.

In practice, it is found that the molded article in the shape of a truncated sector of a circle has sufficient resiliency in its body and flexibility in its ends that when bent in the form of a circle with its ends meeting or overlapping, it will simulate the shape of a frustrum of a cone. This curved or bent article may be inserted in a hollow rayon cake as a support for the cake during the doffing and washing of the cake, and may further be employed where desired as a bobbin in winding the thread. Where employed in this manner, it is found that the layers of impregnated sheet material protect the wire screen insert in the molded article from the acids normally present in the spun rayon material. It is further found that the ends of the molded article possesses sufficient flexibility that when the article is bent into the shape of a frustrum of a cone and inserted in the cake, the ends will not cut or embed themselves into the rayon material.

The molded article of this invention possesses sufficient resiliency that when bent, as hereinbefore described, its ends may overlap in varying amounts to provide a support of variable diameter for supporting rayon cakes of different sizes. In the claims, where the term "ends meet" is employed, it is to be construed as covering both the meeting of the ends and the overlapping of the ends of the molded unit.

Although this invention has been described with reference to a particular embodiment thereof, it is, of course, not to be limited thereto except insofar as is necessitated by the prior art and the scope of the appended claims.

I claim as my invention:

1. An insert for supporting rayon cakes comprising, in combination, layers of sheet material impregnated with a condensation resin disposed in substantially parallel relation with each other, and a screen disposed between certain of the layers of the sheet material to provide permanent resiliency therefor, the layers of the sheet material extending beyond the edges of the screen to protect the screen and provide flexibility in the ends of the insert, the layers of sheet material with the screen therebetween being molded under heat and pressure to form an integral unit.

2. An insert for supporting rayon cakes comprising, in combination, layers of sheet material impregnated with a condensation resin disposed in substantially parallel relation with each other, and a screen disposed between certain of the layers of the sheet material to provide permanent resiliency therefor, the layers of the sheet material extending beyond the edges of the screen and provide flexibility in the ends of the insert, the layers of sheet material with the screen therebetween being molded under heat and pressure to form an integral unit, the molded unit being a substantially thin flat plate having sufficient resiliency to permit bending of the plate to cause its flexible ends to meet.

3. An insert for supporting rayon cakes comprising in combination, inner and outer layers of sheet material impregnated with a condensation resin disposed in substantially parallel relation with each other, a wire screen disposed between the inner layers of the sheet material to provide permanent resiliency, the layers of the sheet material extending beyond the edges of the screen to protect the screen, and the outer layers of the sheet material extending beyond the ends of the inner layers to provide substantially flexible ends, the layers of the sheet material with the screen disposed therebetween being molded under heat and pressure to form an integral resilient unit.

4. An insert for supporting rayon cakes comprising, in combination, inner and outer layers of sheet material impregnated with a condensation resin disposed in substantially parallel relation with each other, a wire screen disposed between the inner layers of the sheet material to provide permanent resiliency, the layers of sheet material extending beyond the edges of the screen to protect it, and the outer layers extending beyond the ends of the inner layers to provide relatively thin and substantially flexible ends, the layers of the sheet material with the screen disposed therebetween being molded under heat and pressure to form an integral resilient unit, a permanent curvature being imparted to the ends of the outer layers of the sheet material extending beyond the ends of the inner layers during the molding to insure flexibility in the ends of the unit.

HOWARD R. MOYER.